April 26, 1966  E. R. MICHALIK ETAL  3,248,197
ENCLOSED CHAMBER FOR FLOATING GLASS ON A MOLTEN BATH
Original Filed May 2, 1962  5 Sheets-Sheet 1
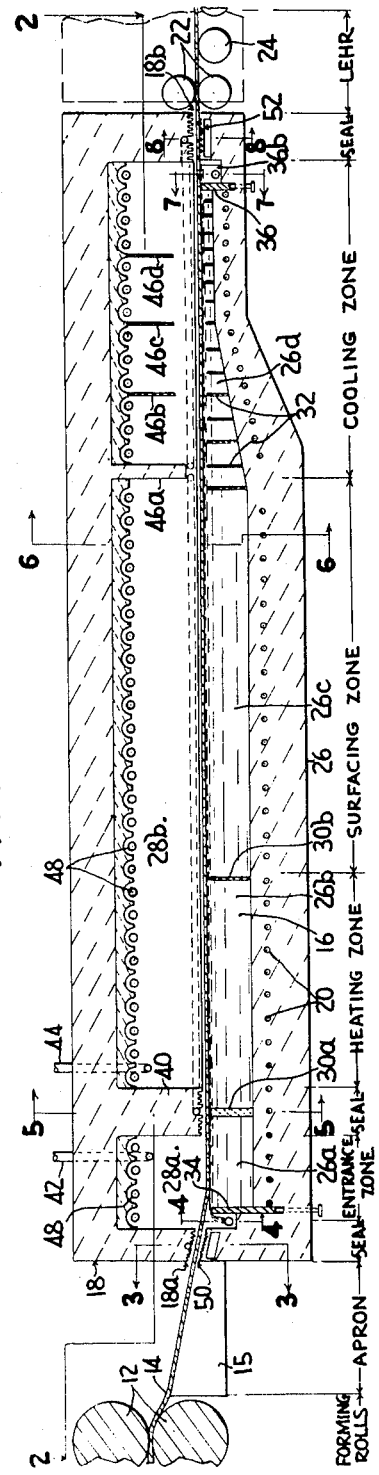
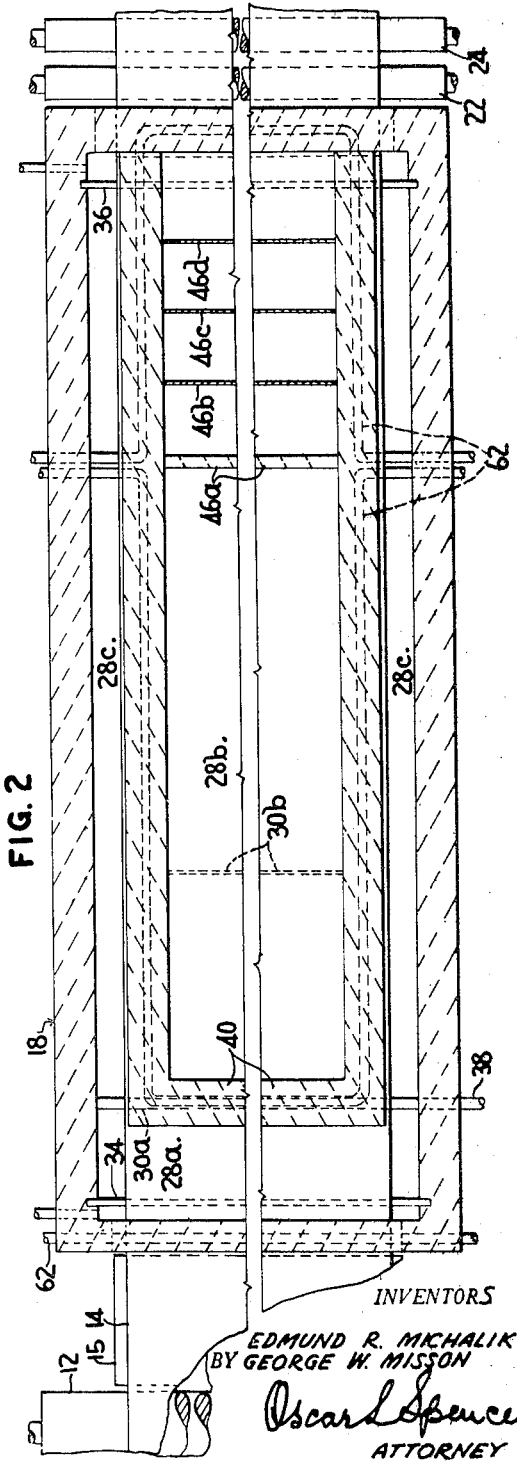
INVENTORS
EDMUND R. MICHALIK
BY GEORGE W. MISSON
Oscar L. Spencer
ATTORNEY INVENTORS
EDMUND R. MICHALIK and
GEORGE W. MISSON
BY
Oscar L. Spencer
ATTORNEY April 26, 1966 E. R. MICHALIK ETAL 3,248,197
ENCLOSED CHAMBER FOR FLOATING GLASS ON A MOLTEN BATH
Original Filed May 2, 1962 5 Sheets-Sheet 3

INVENTORS
EDMUND R. MICHALIK and
GEORGE W. MISSON
BY
Oscar L. Spencer
ATTORNEY

INVENTORS
EDMUND R. MICHALIK
BY GEORGE W. MISSON

*Oscar L. Spencer*
ATTORNEY

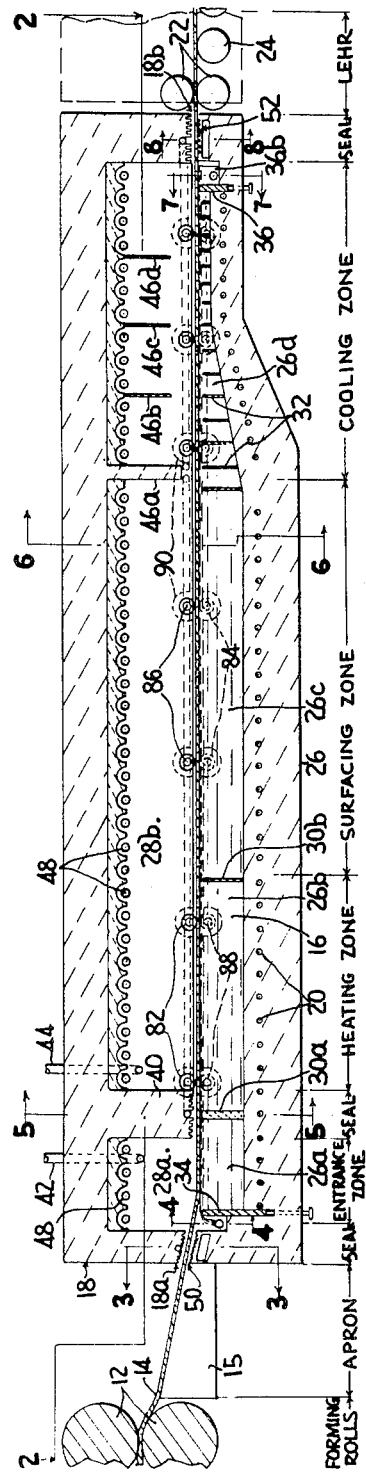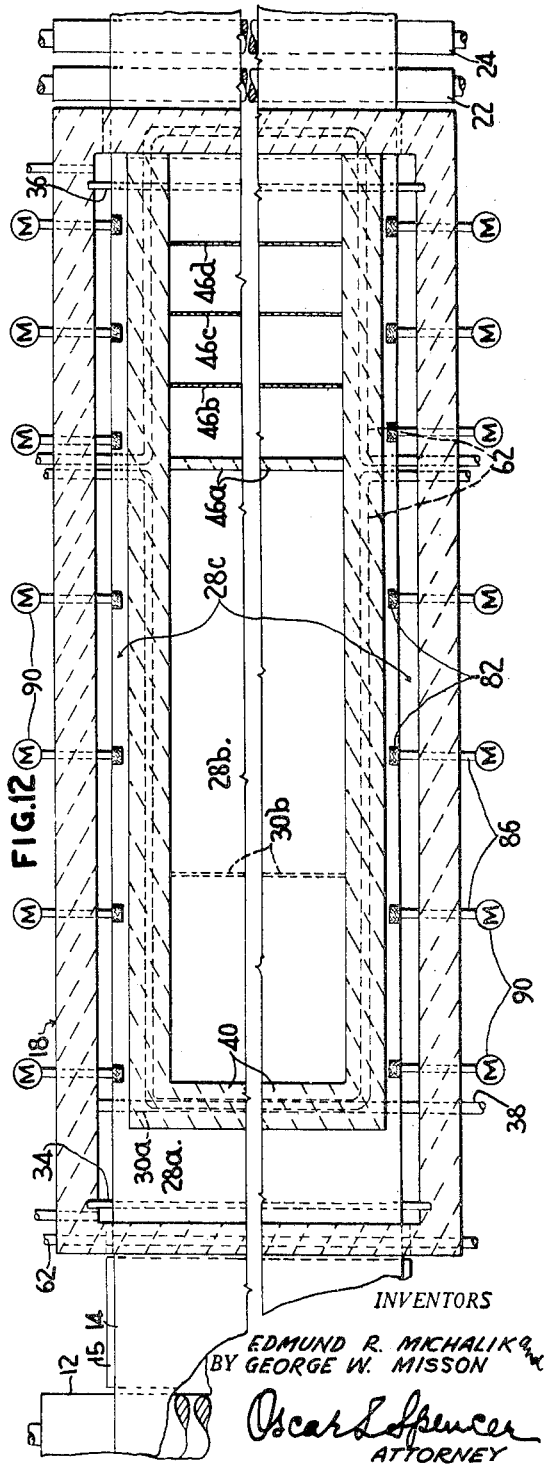

United States Patent Office 3,248,197
Patented Apr. 26, 1966

3,248,197
ENCLOSED CHAMBER FOR FLOATING GLASS
ON A MOLTEN BATH
Edmund R. Michalik, West Mifflin, and George W. Misson, Pittsburgh, Pa., assignors to Pittsburgh Plate Glass Company, Pittsburgh, Pa., a corporation of Pennsylvania
Original application May 2, 1962, Ser. No. 191,833. Divided and this application Jan. 29, 1964, Ser. No. 341,078
2 Claims. (Cl. 65—182)

This application is a division of our copending application Serial No. 191,833, filed May 2, 1962.

This application relates to the manufacture of flat glass by floating glass on a liquid bath, such as molten metal, so that the resultant flat glass has fire-finished surfaces requiring little or no additional surfacing for ultimate use.

It has been proposed heretofore to produce flat glass by floating a ribbon or sheet of glass upon the surface of a bath of molten metal. The product produced by this process has surfaces which differ somewhat from each other. The top surface thereof, because of the heat involved, has a fire-finished surface. The bottom of the ribbon in contact with the molten metal is flat and has a surface having a similar appearance to a fire-finished surface.

When producing float glass of compositions approaching that of commercial plate and window glass or like soda-lime glasses and using a molten metal such as a bath of tin or tin alloy, molten glass poured directly onto the bath of metal ultimately will attain an equilibrium thickness of approximately ¼ inch (hereinafter sometimes called "equilibrium thickness"). Even a preformed ribbon of glass of a thickness different from the equilibrium thickness when remelted while supported on the molten metal, will nevertheless seek the equilibrium thickness. Heretofore, when thinner glasses were desired, it was considered necessary to attenuate the ribbon of glass while in molten condition to produce thicknesses of glass differing from the equilibrium thickness or to subject a stiffened ribbon or sheet of different dimension to only a surface melting treatment. To effect attenuation, traction elements contacting the glass at its marginal edges to maintain ribbon width during attenuation are required. Considerable edge trim is thus required because of the necessary width of the traction elements to chill the glass edges and maintain a substantially constant ribbon width.

The need for glass of thicknesses different from the equilibrium thickness is great. For example, the majority of laminated glass assemblies usable in the automotive industry are constructed of two pieces of glass of a thickness less than the equilibrium thickness (usually of the order of 3/16 or 1/8 inch) with a layer of plastic sandwiched therebetween. According to the invention described in the copending application of Edmund R. Michalik, Serial No. 188,664, filed April 19, 1962, now abandoned, it has been found that glass of conventional plate and window composition and of any desired thickness different from the described equilibrium thickness can be produced by floating a sheet or ribbon of glass on the surface of a molten bath of metal such as tin or tin alloy having a density greater than that of the glass and holding the glass at a melting temperature while modifying the apparent weight density of the glass with respect to the weight density of the metal of the bath, i.e., by changing the degree of immersion of the glass in the metal. Thus, it has now been found that when the glass displaces a greater quantity of metal than that usually displaced under normal atmospheric conditions, the molten glass tends to stabilize at a thinner thickness than the equilibrium thickness and vice versa. Thus, modifying the degree of immersion of the glass in the metal results in a modification of the amount of metal displaced by the glass which may be greater or less than that usually displaced dependent on the modification exacted.

This change in displacement of metal by the glass by modification of the apparent weight density of the glass with respect to that of the metal may be accomplished effectively by selectively applying a fluid pressure over the major portion of the glass which is different from the fluid pressure which is applied to the surface of the metal at an edge of the glass or preferably at a pair of opposed edges, of the glass sheet. For most purposes, it is found preferable to apply this different fluid pressure only to a portion of the surface of the glass sheet leaving a margin, generally a pair of opposed margins, of the glass sheet, exposed to another fluid pressure which may be the same as or different from that applied to the metal surface at the glass edge.

By selecting the magnitude of the pressure on the central areas of the glass and supplying a ribbon of desired thickness to the bath, the maintenance of this desired glass thickness is insured. If a ribbon of a thickness other than that which is desired is supplied to the metal bath then, because of the character of molten glass to flow, a ribbon of the desired thickness can be produced by proper selection of the pressure which modifies the apparent densities of the glass with respect to the bath. Because of the temperatures involved, the glass attains surfaces characteristic of fire-finished surfaces, so that little or no subsequent abrasive surfacing is required for ultimate use.

When the treated glass is cooled sufficiently, it is withdrawn from the metal bath without surface damage due to equipment contact, as by applying only a tractive force to the glass ribbon. Since attenuation of the glass becomes less important in accordance with the teachings of the aforesaid application, special apparatus within the confines of the metal bath or contiguous thereto to contact the glass surfaces is not required in contrast to previous processes.

The present invention is directed to a method and apparatus which makes it possible to produce glass according to the invention described and claimed in the aforesaid copending application and also in accordance with the method described wherein edge traction devices are used to attenuate the glass. Also included within the scope of this invention is an arrangement to maintain a specified molten bath metal level which provides a self-cleaning flow of the metal of the bath.

According to an effective method of practicing the invention, a ribbon of glass is presized as to thickness and width by convenient means, such as by passing molten glass through a slot or between sizing rolls and cooling the ribbon to stabilize its dimensions. This ribbon is then passed to a pool of molten metal having a greater density than that of the ribbon and the ribbon is floated on the surface of the metal during its movement thereacross. A super-atmospheric pressure is applied to the upper surface of a central area of the ribbon while providing adequate marginal seals so that the fluid pressure on the metal surface at the side edges of the glass and preferably on the margins of the ribbon is atmospheric. At the same time the temperature of the ribbon is raised to a melting temperature. After the surfaces of the ribbon have improved, i.e., smoothed out, and surface defects have been eliminated or reduced in magnitude or number, the ribbon is cooled to a stiffened state and is removed from the metal.

The apparatus of this invention includes the tank containing the molten metal and the marginal seals for maintaining a pressure differential between chambers of the tank above the metal bath if so desired. The apparatus may be used in another embodiment to be described.

In using the apparatus of this invention, the ribbon may be delivered to the surface of the molten bath in a molten or substantially molten state and held molten until it has stabilized and the surface thereof has become smooth. Various differentials between the pressure applied to the glass and the metal at the glass edge may be established as will become more apparent hereinafter.

According to a further embodiment of this invention, glass may be prepared without establishing a differential pressure between the respective portions of the glass. For example, a molten or softened ribbon of glass may be floated on the molten pool and allowed to come to equilibrium or the surfaces thereof to smooth out while the margins thereof are disposed under walls having pipes therein through which cold gas may be directed onto these margins, so that the ribbon edges harden while the central area thereof remains soft or plastic. These hardened edges may then be tightly gripped by narrow stub rolls spaced along the edges of the ribbon to drive the ribbon or to hold it to the desired width and permit lengthwise attenuation of the ribbon by pulling the ribbon longitudinally by rolls 22 substantially as suggested in Belgian Patent No. 567,339 and South African Patents Nos. 60/3,067 and 60/3,068, granted to Pilkington Brothers Limited. Because the edges are rapidly cooled, the dimensions of the ribbon are rapidly fixed and the edges may be tightly gripped permitting rapid and effective attenuation to produce a ribbon thinner than the equilibrium thickness.

To further describe the invention, attention is directed to the accompanying drawings in which like reference characters refer to like parts and in which:

FIG. 1 is a longitudinal section of an apparatus for producing glass according to the inventive process herein contemplated showing means for selectively applying a super-atmospheric pressure to the top of a ribbon of glass supported on a molten metal bath;

FIG. 2 is a horizontal sectional view taken on line 2—2 of FIG. 1 looking in the direction of the arrows showing a pair of forming rolls at the discharge end of a glass melting tank and the molten metal tank;

FIGS. 11 and 12 are views similar to FIGS. 1 and 2 showing edge gripping means for moving the sheet and attenuating the sheet.

Figure 3:
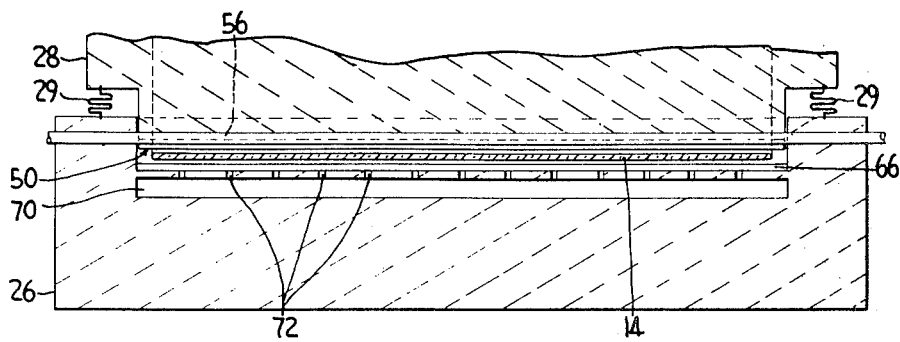
FIG. 3 is a sectional view taken on line 3—3 of FIG. 1 and in the direction of the arrows partly showing a seal at the entrance end of the molten metal tank.
Figure 4:
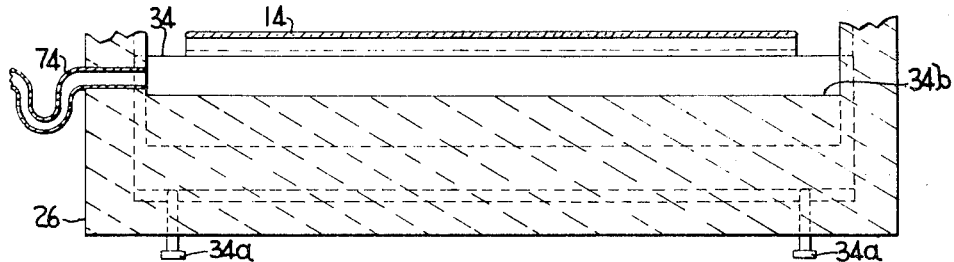
FIG. 4 is a sectional view taken on line 4—4 of FIG. 1 and in the direction of the arrows showing a liquid metal level control structure at the entrance end of the molten metal tank.

With particular reference to the drawings, in FIG. 1 there is shown a pair of forming rolls 12 at the delivery end of a glass melting furnace of conventional construction (not shown) to form a ribbon of glass 14 which is delivered onto an apron arrangement 15 and thence onto the surface of a bath of molten metal 16 contained within a tank 18. The molten metal has a density greater than the glass ribbon 14, so that the ribbon floats on the surface of the molten metal. The metal may be tin, an alloy of tin, or the like.

In order to maintain the metal of the bath 16 in molten condition, thermal regulating means, such as electrodes 20 may be located in the floor of the tank 18, as illustrated, or may be submerged within the molten metal, so as to affect the temperature of the bath. The electrodes 20 are connected to a suitable source of power (not shown) in a conventional manner. Each electrode may be individually energized and controlled, so as to provide a desired thermal gradient within the various sections of the tank 18, as will be described. The glass ribbon 14, after treatment within the tank 18, is withdrawn from the tank without injury to its surfaces by traction or pinch rolls 22 onto a roller conveyor 24.

Figure 5:
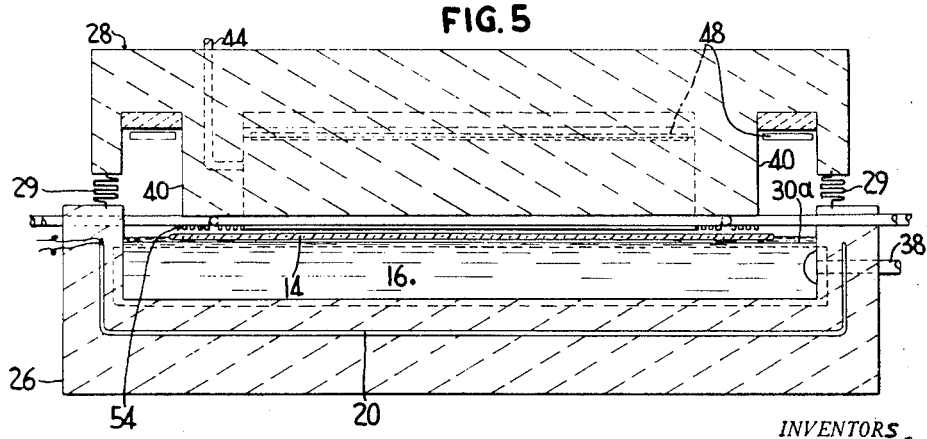
FIG. 5 is a sectional view taken on line 5—5 of FIG. 1 and in the direction of the arrows showing a wall and seal construction between the entrance and heating zones of the metal bath tank.
Figure 6:
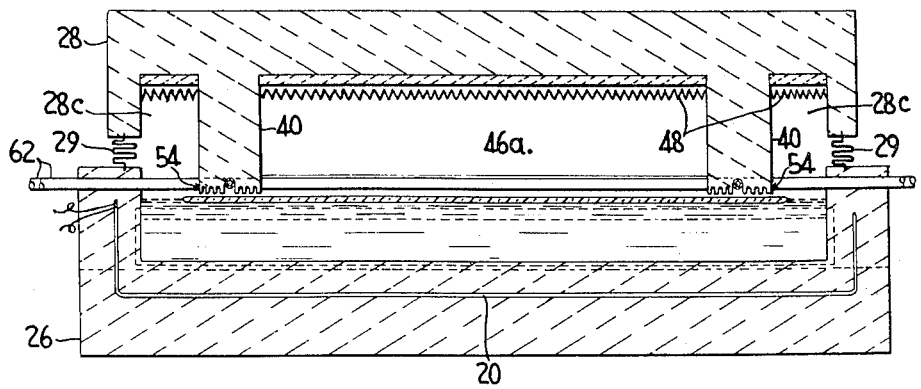
FIG. 6 is a sectional view taken on line 6—6 of FIG. 1 and in the direction of the arrows showing the surfacing zone and a tank wall construction.

The tank 18 is constructed of a refractory bottom portion 26 and a refractory top portion 28, joined and sealed together, except for an entrance 18a and an exit 18b, by a suitable sealing means 29 (FIGS. 3, 4, 6 and 8). The sealing means illustrated is of a bellows type and permits the top portion 28 of the tank to be raised from the bottom portion 26 for repairs, etc., without the necessity of removing refractroy parts and the subsequent repair of removed parts. The bottom portion 26 contains the molten metal 16 and is subdivided into an entrance zone 26a, a heating zone 26b, a surfacing zone 26c and a cooling zone 26d. These zones are defined by submerged walls or baffles 30a, 30b, and 30c, so built to materially reduce convection currents in the molten metal between the various zones. Other submerged baffles 32 are in the cooling zone to control convection currents in that zone. The level of the metal of the bath is controlled by level control weir 34 at the entrance end of the tank 18, a level control weir 36 at the exit end of the tank, and by an inlet 38. Preferably, the metal level is always maintained so that the glass ribbon being treated remains free of contact with any submerged wall or baffle within the tank 18. The inlet 38 (see FIG. 5) is located through a wall of the tank 18 and is connected to a suitable source of molten metal to supply molten metal to the tank 18. The level control arrangement of weirs 34 and 36 and other details of such control will be later described in detail.

The space between the top portion 28 and the surface of the metal pool is divided into two chambers 28a and 28b by the front side of a circumferential wall 40. This wall depends from the roof 28 and has its side sections spaced from the walls of tank 18 thereby providing a gas space 28c along each side of the tank . This gas space 28c may in effect be a continuation or extension of chamber 28a.

A gas which is inert to the components of the bath, such as nitrogen or the like, is introduced, under pressure, into each gas chamber or pressure zone, through conduits 42 and 44, each connected to a suitable source of the pressurized gas (not shown). The gas is preferably heated, so as to eliminate chilling of the zones and the glass being treated. The pressure at which the gas is introduced into the zones 28a and 28c is different from the pressure of the gas introduced into the zone 28b, as will be later described in detail. The pressure zone 28b may be further subdivided by walls or baffles 46a, 46b, 46c and 46d for temperature control purposes.

Radiant heaters 48 are located adjacent the roof of the tank 18 to maintain the desired glass temperature between the exit and entrance ends of the tank. These radiant heaters 48, located in both pressure zones, as illustrated, are connected in a conventional manner to a source of electric power (not shown) and may be individually controlled for temperature gradient control. The control means is any conventional control means and need not be described and shown in detail. If necessary, cooling means can be located above the cooling zone to insure the proper temperature of the glass being removed from the bath.

Figure 10:
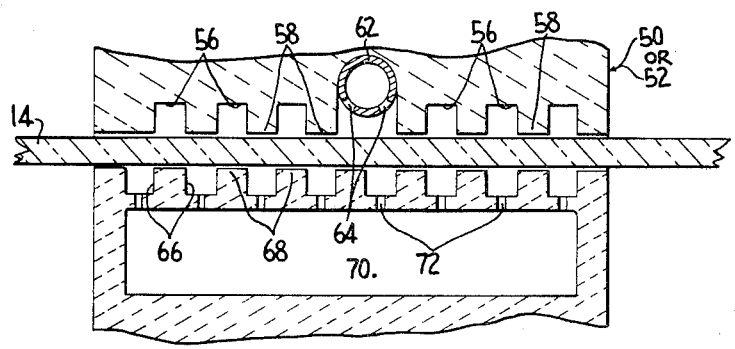
FIG. 10 is an enlarged view showing a typical pressure seal arrangement for the exit or entrance ends of the molten metal containing tank.

In order to maintain the pressures within the zones of the tank, and above the molten metal and prevent the leakage of the inert gas from the zones, various pressure seals are used. There are pressure seal arrangements 50 and 52 at the entrance and exit ends, respectively, of the tank 18. There is a pressure seal arrangement 54 associated with the wall 40 which subdivides the top portion 28 of the tank 18 into the pressure zones 28a, 28b and 28c. The top portion of pressure seal arrangements 50 and 52 (illustrated in FIG. 10) and the pressure seal arrangement 54 are similar in construction. Each includes a plurality of grooves 56 separated by lands 58, and a central or intermediate groove 60. The grooves 56 need not be continuous but may be interrupted by wall sections or the like. In the embodiment shown, the groove 60 receives a pipe 62 connected to a source of heated inert gas. The pipe 62 is provided with spaced orifices 64, so as to discharge a curtain of inert gas generally downwardly and toward or against the surface of the glass. As illustrated, there are two rows of orifices 64 spaced 90 degrees apart, each row discharging gas at an angle of approximately 45 degrees to the horizontal. The discharged gas flows outwardly and inwardly across the lands and grooves and the glass from its discharge location. The grooves cause turbulence in the discharge of gas and thus the gas flowing across the glass minimizes leakage of pressure gas from one zone to another or to the atmosphere or the entrance of atmospheric air into a pressure zone. The pressure of the gas is chosen to accomplish the pressure seal function.

To prevent undue chilling of the glass ribbon at least in the heating and surfacing zones, the gas introduced into the pipes 62 adjacent those zones is heated to at least the temperature of the bath, while the gas introduced into pipes 62 adjacent the cooling zone need not be so heated. Thus, pipes 62a and 62b connected to pipes 62 and to the source of pressure gas at different temperatures are provided for supplying the different pressure gas.

The entrance and exit seal arrangements 50 and 52 have a lower portion which also provides a gaseous support for the glass to prevent damage thereto from contact with the tank. Each lower portion includes a plurality of grooves 66 separated by lands 68, a plenum chamber 70 connected to a suitable source of inert gas under pressure, and a plurality of orifices 72 for passage of the gas from the plenum to the grooves. The lower seal arrangements can be constructed to be adjustable in vertical location. To accomplish this, they can be built on a taper with a screw adjustment. Thus, horizontal movement causes vertical location adjustment. Another arrangement is to construct the lower pressure seal as a unit or piston-like member fitting into a pressure chamber, so that variation in fluid pressure causes variations in vertical positioning.

The apron arrangement 15 may take several forms without departing from the spirit of the invention. For example, it may include a conventional series of rollers, as illustrated in United States Patent No. 1,954,077 to Gelstharp or it may be a slip table as illustrated in United States Patent No. 1,657,212 to Hitchcock.

Figure 7:
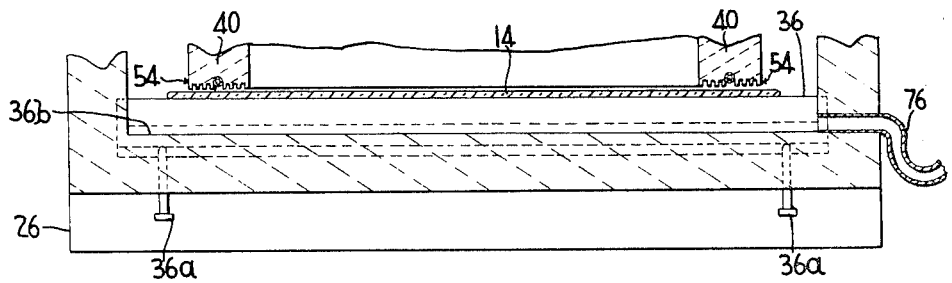
FIG. 7 is a sectional view taken on line 7—7 of FIG. 1 and in the direction of the arrows showing a molten metal level control structure at the exit end of the molten metal tank.
Figure 8:
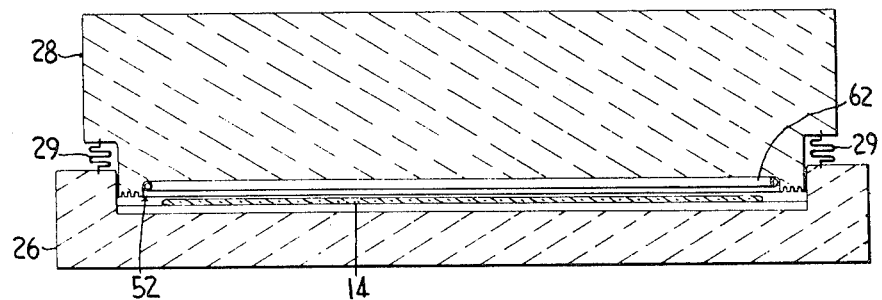
FIG. 8 is a sectional view taken on line 8—8 of FIG. 1 looking in the direction of the arrows showing the exit seal of the molten metal tank and indicating traction means for withdrawing the ribbon of glass.
Figure 9:
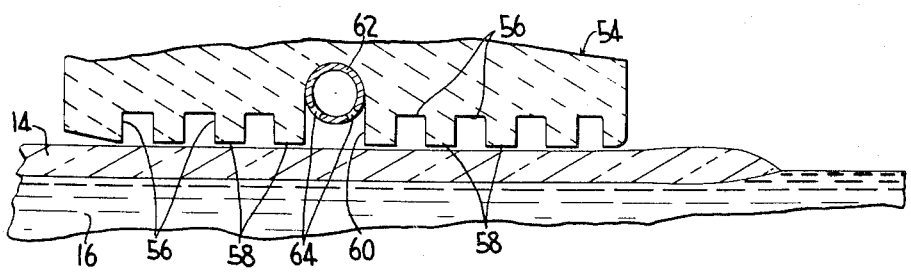
FIG. 9 is an enlarged view showing in detail the seal structure for the glass ribbon edge portions.

Means are provided for controlling the level of the molten metal in the bath 16 and may include, as illustrated, the weirs 34 and 36 and the inlet 38. The weirs 34 and 36 are plates of a refractory material slidable within slots formed in the tank refractory parts. The weirs are vertically adjustable by suitable means, as screws 34a and 36a, respectively (FIG. 4), so as to adjust the molten metal level depending upon the thickness of glass being produced. Each weir defines one side of a trough 34b and 36b, respectively (FIG. 7), the other sides and bottoms of the troughs being defined by walls of the tank 18 or other suitable refractory material. Conduits 74 and 76 pass through the walls of the tank 18 and communicate at one end with the troughs 34b and 36b, respectively.

Each conduit is connected to discharge molten metal into a sump (not shown) for regeneration and reheating and from which molten metal is pumped to the tank 18 through the inlet 38. Each conduit 74 and 76 is provided with a trap, i.e., a U-bend in the conduit, so as to prevent the entrance of atmospheric air into the tank 18 which would cause oxidation of the metal of the bath.

In the operation of this device illustrated a ribbon of glass is formed by passage of molten glass between a pair of forming rolls 12 from a source thereof, such as a conventional glass melting tank, and the ribbon 14 is delivered to the front section of the tank 18 passing through the front or entrance seal 50.

Gas which is inert to the metal is fed into a pipe 62a and flows downwardly impinging against the glass and thereby isolates the interior of the tank 18 from the outside atmosphere. A similar gas is supplied to the plenum chamber 70 under pressure high enough to cause the gas in this chamber to flow through the orifices into the grooves 66 and to hold the ribbon away from the solid parts of the tank.

In general this gas is preheated by means not shown to a temperature sufficiently high to prevent undue cooling of the glass. Normally, the temperature of the gas supplied to pipe 62a and chamber 70 will be above 500 to 1000° F. and often in the range of 1400° F. up to a melting temperature of the glass.

After the ribbon 14 has entered chamber 28a it is laid upon the surface of the molten metal and is lead through the seal 54 into the chamber 28b.

As shown in the drawings, the ribbon 14 has a width greater than that enclosed by the wall 40 thus providing a narrow margin which extends beyond the edges of the wall 40 into the chambers 28c. Sealing gas is delivered to the pipes 62, disposed in the wall 40 and caused to impinge against the edge portion of the ribbon which is immediately below the walls 40, thereby separating the chamber 28b from 28c as a gaseous curtain. This gas creates a curtain and is supplied at a pressure equal to or greater than the pressure established on each side of the curtain. The temperature of the gas supplied to front section and side sections of these walls in front of baffle 46a generally should approximate a melting temperature of the glass or at least should be high enough so as to avoid cooling the ribbon edges below a melting temperature.

The ribbon 14 while floating on the metal surface advances through the chamber 28b and finally is withdrawn from the tank 18 passing through the seal 52. It is pulled from the tank between the traction rolls 22 which may, if desired or if necessary, exact enough tension upon the ribbon to keep it moving. Enough tension may be applied by these rolls to cause the ribbon to attenuate or stretch to a thinner ribbon if desired.

As the ribbon passes through the chamber 28b, the temperature is maintained high enough to cause the ribbon to become molten during a substantial distance of its path. During this time the surfaces of the ribbon smooth out and the ribbon seeks an equilibrium thickness the magnitude of which is dependent upon the pressure established within chamber 28b.

The pressure required in the chamber 28b depends upon the thickness desired and the external pressure, i.e., the pressure in the chamber 28c to which the edges of the ribbon extend. Where it is desired to produce a ribbon thinner than the aforesaid equilibrium thickness, i.e., about 0.27 inch, the pressure in the chamber 28b should be above, normally at least 0.01 ounce per square inch above, that pressure at the edges of the molten ribbon, e.g., in the chamber 28c.

For example, the ribbon tends to stabilize at a thickness of 3/16 inch when the pressure differential is 0.11 ounce per square inch.

The degree of stabilization is a function of time. Consequently, it is readily possible to produce glass 0.125 inch in thickness simply by sizing the thickness of the ribbon at this thickness or slightly lower, subjecting the sized ribbon to the treatment herein contemplated at a suitable pressure of about 0.2 ounce per square inch, which includes improving its surfaces, and removing the sheet before its thickness can grow unduly.

In general the pressure differential established between the chamber 28b and that at the edge of the sheet or ribbon ranges from 0.01 to 2 ounces per square inch. High differential pressures normally are unnecessary and may be difficult to maintain. They should in no event be so high as to cause the ribbon to break and rarely are above 5 to 10 ounces per square inch.

The temperature established in the fore part of the chamber 28b is a melting temperature of the glass of the ribbon. Toward the end, i.e., beyond baffle 46a the temperature is reduced low enough to ensure delivery of a stable ribbon which is not marred by contact with rolls to the discharge end of the tank, for example 600 to 800° F. or below.

The rate of movement of the ribbon over the pool is controlled so as to ensure a smoothing of the surfaces of the ribbon and in general this is best accomplished by bringing a section of the ribbon to molten state.

It will be understood that the gas discharged through pipes 62 along walls 40 is supplied at a pressure or at a velocity sufficient to maintain the pressure differential between chambers 28b and 28c. As previously explained the gas which is discharged in this way beside areas where the ribbon is being heated to or is held at a melting temperature, is heated to a temperature substantially that of the glass. On the other hand at the farther ends of the chamber, e.g., beyond baffle 46a, the ribbon is cooled and gas supplied to pipes 62 along these portions of walls 40 normally is substantially cooler, rarely above the temperature of the portion of ribbon opposite such wall portions and may advantageously be much lower in temperature.

*Example I*

A ribbon of glass of convenient width, for example 12 inches or more, having a composition, by weight, of 71.38 percent $SiO_2$, 13.256 percent $Na_2O+K_2O$, 11.76 percent CaO, 2.54 percent MgO, 0.75 percent $Na_2SO_4$, 0.15 percent $Al_2O_3$, 0.11 percent $Fe_2O_3$, and 0.06 percent NaCl, and a weight density of 2.542 grams per cubic centimeter is formed by a pair of rolls to a thickness of substantially 0.125 inch and delivered at 1400° F. and floated upon the surface of a molten bath of metal of 100 percent tin having a weight density of 6.52 grams per cubic centimeter at 1800° F. The tank of molten metal is of the construction illustrated in the drawing and is longitudinally divided into three sections, an entrance section of which is maintained at a temperature of 1500° F., a melting section the metal of which is maintained at a temperature of 1900° F. and a cooling section in which the metal is at a temperature ranging from 1900° F. to 1000° F. The space above the metal is subdivided into two pressure chambers and pressurized gas is fed to each chamber the gas is preheated to 1900° F. for this supply. The first chamber 28a is maintained at slightly above atmospheric pressure while the second chamber 28b is maintained at 0.5 ounce per square inch gauge pressure, so that a pressure differential of 0.3 ounce per square inch existed between the two chambers.

The width of the ribbon is greater than the width of the second chamber so that the margins of the ribbon extend laterally beyond the outer side edge of the chamber. The pressure over the extending margin is atmospheric. The glass is heated from above to a temperature of 1900° F. in the second chamber to remelt the ribbon throughout its entire thickness in a section across the entire width of the ribbon under the chamber and is then cooled to 1000° F. at the exit of the molten metal tank after which it was withdrawn from metal contact.

The ribbon thickness remains at substantially 0.125 inch and the surfaces are fire-finished and flat except for the edges which are bulbed.

The interior and exterior of the second chamber are separated by a gas curtain as illustrated in the drawing wherein the gas is delivered at a pressure of 0.5 ounce per square inch.

Various other embodiments of the process may be practiced. For example, the ribbon may be supplied substantially at melting temperature to the molten metal, held molten for a period and then gradually cooled.

Furthermore, the pressure in chamber 28b may be lower than the pressure in 28c. In this case the ribbon tends to stabilize at a thickness greater than the equilibrium thickness. Thus, a subatmospheric pressure may be imposed in chamber 28b to establish a differential pressure between 28b and 28c of 0.01 to 2 ounces per square inch to produce thicker sheets substantially according to the following table:

| Pressure of 28c minus pressure of 28b: | Stabilizing thickness, inches |
|---|---|
| 0.05 ounce per square inch | 0.31 |
| 0.10 ounce per square inch | 0.34 |
| 0.20 ounce per square inch | 0.42 |

*Example II*

A circle of glass having a diameter of 10 inches and a thickness of 0.194 inch, which composition was by weight 73.00 percent $SiO_2$, 13.24 percent $Na_2O+K_2O$, 8.44 percent CaO, 3.53 percent MgO, 0.42 percent $Na_2SO_4$, 1.28 percent $Al_2O_3$ and 0.09 percent $Fe_2O_3$ with a density of 2.501 grams per square centimeter was preheated to 700° F. and centrally placed on a bath of molten tin (100 percent) having a density of 6.52 grams per square centimeter at 1800° F. within a furnace. The glass floated on the surface of the molten tin. A cup-shaped graphite head 7.82 inches in diameter having a cavity 7.37 inches in diameter was lowered so that the lower extremities of its walls were within 0.004 inch from the surface of the glass on the bath. A gas inert with respect to the glass and the tin and composed of 93 percent nitrogen and 7 percent hydrogen by volume, with a dew point of minus 70° C. was preheated to approximately the same temperature as the bath in the heating chamber and was fed centrally to the head into the cavity enclosed by the walls thereof. Leakage between the walls and the glass occurred, so that the gas was fed into the head at 0.46 ounce per square inch and this pressure was maintained in the cavity. The area outside the head within the furnace was pressurized by the leakage to a pressure of 0.29 ounce per square inch. The pressure differential of 0.17 ounce per square inch between the interior and exterior of the head was maintained for this example.

The glass and the tin bath were heated simultaneously to 1800° F. at a rate of approximately 340° F. per hour and were held at 1800° F. for 20 minutes. The glass and the tin bath were then cooled to 700° F. at a rate of approximately 200° F. per hour. The glass was then removed from the bath without damage.

The glass circle thickness was measured and was found to have a marginal portion approximately 7.37 inches in inside diameter, 0.247 inch in thickness, and a center portion depressed to a diameter which ranged from 0.150 inch at its edges to 0.180 inch at its center. The bottom of the glass exhibited a smooth flat surface. The top surface exhibited a fire-polished finish.

As previously mentioned, the glass may be attenuated while on the bath and preferably, in such case, cold gas is directed onto the edge of the ribbon from pipes 62, especially after the glass has passed through the surfacing zone. In this process, edge gripping means, such as rollers or the like, are used. An arrangement for this process is illustrated in FIGS. 11 and 12 where, in addition to the parts identified with respect to FIG. 1 and which are similarly identified by the same reference characters, edge gripping means 80 which include upper and lower gripping rolls 82, 84 are used. Each roll is mounted on a shaft 86, 88, respectively, driven by a motor 90, so as to have uniform rotation rates. As is obvious, the pairs of rollers, of which there are many and which are spaced along both edges of the glass ribbon, are driven when attenuation is desired, at a speed in excess of that at which the ribbon is fed onto the bath of molten metal. The rollers may be hollow, so as to have a flow of cooling fluid therethrough, if necessary or desired.

In lieu of molten tin or tin alloy, other stable molten materials having a greater density than the glass of the ribbon may be used including: lead, lead-zinc alloys, lithium or the like and metal salts such as copper chloride, lead chloride, and like materials which have a density above about 2.5 and are stable, essentially nonvolatile, liquids at the melting temperature of the glass treated.

Although the present invention has been described with reference to certain specific details, it is not intended that such details shall be regarded as limitations upon the scope of the invention except insofar as included in the accompanying claims.

We claim:

1. An apparatus for producing flat glass wherein a body of molten metal is disposed therein so as to provide an upper surface upon a portion of which surface molten glass is adapted to be supported so that a portion of the upper surface of said body of molten metal is beneath said glass and an adjacent portion of said upper surface is free of glass, said apparatus comprising a closed chamber substantially free from atmospheric gases overlying the surface of said molten metal free of glass and at least a portion of the molten glass adjacent thereto, means for continuously introducing molten metal into said apparatus, overflow means for selecting a level of molten metal within said apparatus, an outlet means in said apparatus for removing molten metal therefrom and means for preventing the flow of atmospheric gases through said outlet means into said apparatus.

2. An apparatus as recited in claim 1 wherein said overflow means is a wall having an adjustable portion and means for maintaining said adjustable portion in a selected position whereby a selected level of said body of molten metal is maintained within said apparatus.

References Cited by the Examiner

UNITED STATES PATENTS

| | | | |
|---|---|---|---|
| 710,357 | 9/1902 | Heal | 65—182 |
| 810,865 | 1/1906 | Hoover et al. | 65—182 |
| 1,622,817 | 3/1927 | Waldron | 65—182 |

FOREIGN PATENTS

| | | |
|---|---|---|
| 1,259,060 | 3/1961 | France. |

DONALL H. SYLVESTER, *Primary Examiner.*